United States Patent
Möller et al.

[11] Patent Number: 5,482,325
[45] Date of Patent: Jan. 9, 1996

[54] HEIGHT-ADJUSTABLE GUIDE FITTING FOR A SEAT BELT OF A MOTOR VEHICLE

[75] Inventors: Thomas Möller, Hamburg; Helmut Möckel, Uetersen, both of Germany

[73] Assignee: Autoliv Development AB, Vargarda, Sweden

[21] Appl. No.: 293,124

[22] Filed: Aug. 19, 1994

[30] Foreign Application Priority Data

Aug. 19, 1993 [DE] Germany .......................... 43 27 820.5

[51] Int. Cl.⁶ ................................................. B60R 22/20
[52] U.S. Cl. ........................................................ 280/801.2
[58] Field of Search ................................ 280/808, 801.2; 297/483; 248/297.3

[56] References Cited

U.S. PATENT DOCUMENTS 4,989,900  2/1991  Steinhüser ............................ 280/801.2

*Primary Examiner*—Karin L. Tyson
*Attorney, Agent, or Firm*—Robert W. Becker & Associates

[57] ABSTRACT

A height-adjustable guide fitting for a seat belt of a motor vehicle has a rail member with a guide groove connected to the motor vehicle. The rail member has catch openings spaced at a distance from one another. A longitudinally slidable slide is positioned within the guide groove. A locking member is connected to the slide and in pivotable between a locked position and a release position. The locking member has a spring for biasing the locking member into the locked position and has a locking projection for engaging in the locked position a catch opening to thereby block the locking member relative to the rail member. A device for releasing the locking member is provided. The locking member has a lock lever pivotable between a position within the contour of the locking member and an outwardly pivoted engaging position for engaging one of the catch openings. A forced guiding system couples the lock lever to the slide such that a movement of the locking member relative to the slide upon displacement of the locking member from the locked position to the release position causes a pivoting of the lock lever relative to the locking member.

3 Claims, 2 Drawing Sheets

HEIGHT-ADJUSTABLE GUIDE FITTING FOR A SEAT BELT OF A MOTOR VEHICLE

BACKGROUND OF THE INVENTION

The present invention relates to a height-adjustable guide fitting for a seat belt of a motor vehicle with a rail member connected to the motor vehicle that provides a guide groove with parallel stays in which guide groove a slide is longitudinally displaceable. A locking member biased by a spring is pivotably supported on the slide and is pivotable between a lock position and a release position. The rail member is provided with catch openings spaced at a distance from one another. The locking member has a locking projection for engaging in the locked position one of the catch openings to thereby block the locking member relative to the rail member under the action of the spring. The guide fitting further comprises a device for releasing the locking member. The locking member further has a lock lever pivotable between a position within the contour of the locking member and an outwardly pivoted engaging position for engaging one of the catch openings.

A guide fitting of the aforementioned kind is disclosed in U.S. Pat. No. 4,989,900. When such a height-adjustable guide fitting is a component of a seat belt system with a tightening device, it must be taken into consideration that in all intermediate positions of the guide fitting within the rail member, in which positions no locking of the guide fitting with respect to the rail member is provided, upon activation of the tightening device a locking of the guide fitting in the nearest available catch opening of the rail member is ensured. As a solution to this problem it is suggested in the U.S. Pat. No. 4,989,900 to provide the height-adjustable guide fitting with an additional lock lever attached to the locking member. This lock lever is pivotable between a position within the contour of the locking member and an outwardly pivoted engaging position for engaging one of the catch openings of the rail member. The position in which the lock lever is located within the contour of the locking member allows the guide fitting to freely slide within the rail member. When the lock lever is pivoted outwardly for engaging one of the catch openings of the rail member, a downward movement of the guide fitting exerts torque onto the locking member which results in a pivoting of the locking member into the nearest available catch opening of the rail member.

For activating the lock lever it is suggested in U.S. Pat. No. 4,989,900 that the lock lever, on the one hand, is activated by the acceleration forces resulting from tightening the seat belt, and, on the other hand, that a linkage of the lock lever with the release device for releasing the blockage of the guide fitting is provided so that for displacing the guide fitting upon actuation of the release device the lock lever is also pivoted inwardly into the position within the contour of the locking member.

These suggestions of the prior art have the disadvantage that a control of the lock lever via the aforementioned acceleration forces is not reliably ensured. With respect to a forced coupling with the actuating device, this solution does not provide for the option of upwardly displacing the guide fitting without actuation of the acuating device provided the catch openings are correspondingly designed such that the locking member can slide past the catch openings, but upon load in the downward direction is arrested at these catch openings.

It is therefore an object of the present invention to provide a guide fitting of the aforementioned kind with a simple and secure control of the lock lever.

SUMMARY OF THE INVENTION

The height-adjustable guide fitting for a seat belt of a motor vehicle according to the present invention is primarily characterized by:

A rail member connected to the motor vehicle, the rail member having a guide groove;

The rail member having catch openings spaced at a distance from one another;

A slide positioned within the guide groove so as to be longitudinally slidable therein;

A locking member connected to the slide so as to be pivotable between a locked position and a release position;

The locking member comprising a spring for biasing the locking member into the locked position;

The locking member having a locking projection for engaging in the locked position one of the catch openings to thereby block the locking member relative to the rail member;

A device for releasing (release device) the locking member from the locked position;

The locking member further comprising a lock lever pivotable between a position within a contour of the locking member and an outwardly pivoted engaging position for engaging one of the catch openings; and A forced guiding system for coupling the lock lever to the slide such that a movement of the locking member relative to the slide upon displacement of the locking member from the locked position to the release position causes a pivoting of the lock lever relative to the locking member. Preferably, the forced guiding system is comprised of a guide pin and a guide path. The guide path is advantageously positioned within the slide. The guide pin is preferably connected to the lock lever and projects towards the slide in order to engage the guide path. Advantageously, the lock lever has a first and a second end and between the first and second ends a central, thin-walled section extending parallel to the locking member and abutting on the locking member. The first end preferably has a catch projecting within the plane of the locking member for engaging one of the catch openings. The locking member has a bore. The lock lever has at the second end a bearing bolt engaging the bore of the locking member.

According to the basic principle of the present invention, the lock lever is coupled with the slide by means of a forced guide system such that the pivoting of the lock lever relative to the locking member is caused by a relative movement between the slide and the locking member upon movement of the locking member between the locked position and the release position. With such a coupling of the lock lever to the relative movement between the slide and the locking member an especially simple, reliable, and highly effective control of the pivoting of the lock lever is realized because each pivoting of the locking member between its locked position and its release position forcibly results in a corresponding functional position of the lock lever as required for the respective task. In an advantageous manner additional components are avoided; and an impediment of the smooth functioning of the guide fitting and a reduction in comfort of the passenger, caused by a ratchet-like adjustment of the guide fitting, are avoided.

According to one embodiment of the invention it is suggested for forming the forced guide system to provide the lock lever with a guide pin facing the slide which engages a guide path provided within the slide. This design ensures a very simple transfer of control for the pivoting movement of the lock lever.

In another embodiment of the invention it is suggested that the lock lever is provided with a central, thin-walled section extending parallel to the locking member and abutting thereon. One of the ends of the lock lever is provided with a bearing bolt that engages a bore of the locking member and the other end of the lock lever is provided with a catch that- projects within the plane of the locking member for engaging one of the catch openings. With this embodiment a weak spot of the locking member in the area of the lock lever is avoided since no recess, which otherwise would be required to accommodate the lock lever, is needed, while a support function within the bearing area as well as within the catch area is provided within the plane of the locking member.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of a specific embodiment utilizing FIGS. 1 through 6.

Figure 1:
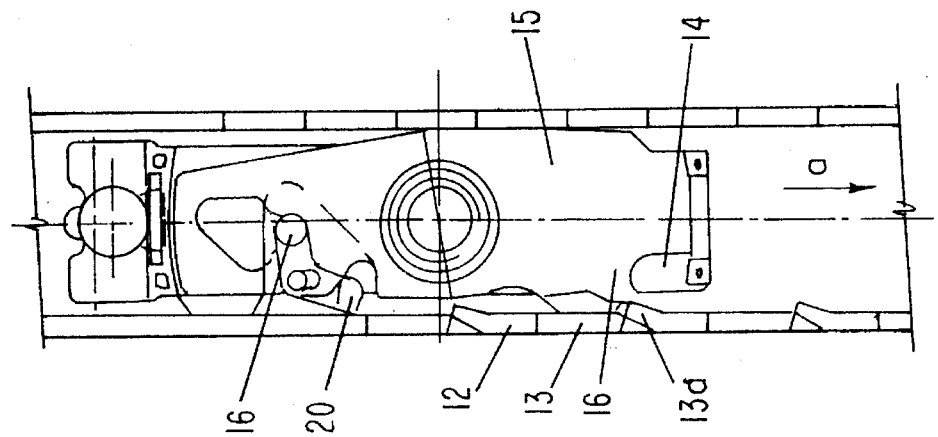
FIG. 1 shows a height-adjustable guide fitting with a slide and a locking member in a front view in the locked position.

As can be seen in FIG. 1, a rail member 10 with a C-shaped cross-section is provided which is, for example, connected to a support beam of a motor vehicle. Between the lateral stays 12 the rail member 10 provides a guide groove 11 for receiving a slide 14 of the height-adjustable guide fitting. One of the stays 12 is provided with catch openings 13 that are spaced at a distance from one another whereby the catch openings 13 are in the form of stamped portions that have a ramp-like catch projection 13a extending into the interior of the guide groove 11.

Figure 2:
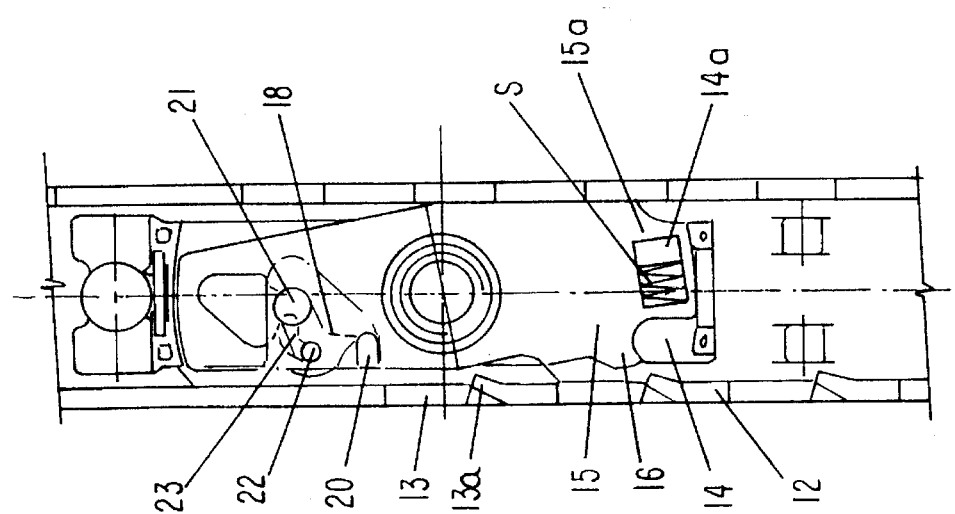
FIG. 2 shows the release position of the guide fitting according to FIG. 1.

Within the rail member 10 a slide 14 is provided that supports the non-represented guide fitting whereby at the slide 14 a locking member 15 is pivotably supported and can be pivoted about an axis 17 between a locked position (FIG. 1) and a release position (FIG. 2). The locking member 15 is provided with a locking projection 16 which engages one of the catch openings 13 in the locked position. Due to the arrangement of the ramp-shaped catch projections 13a it is possible to displace the slide 14 upwardly without actuation of the non-represented release device because the locking member 15, while being biased by a spring S positioned in a window 15a of the locking member 15 and resting at a portion 14a of the slide can still glide along the ramp-shaped rearward slanted portions of the catch projections 13a, but in the opposite direction its movement is blocked by resting at the catch projections 13a during a corresponding load.

The function of a height-adjustable guide fitting of this general type is described in detail in the aforementioned U.S. Pat. No. 4,989,900, the disclosure of which is hereby incorporated by reference.

A lock lever 18 is supported on the locking member 15 which with its thin-walled, central section 19 extends parallel to the locking member 15 and abuts thereon. One end of the lock lever 18 is provided with a bearing bolt 21 engaging a bore of the locking member 15 and the other end of the lock lever 18 is provided with a catch 20 projecting within the plane of the locking member 15. The lock lever 18, in a respective position, engages with the catch 20 one of the catch openings 13 of the stay 12 of the rail member 10. At the underside the lock lever 18 is provided with a guide pin 22 extending toward the slide 14 which is guided in the guide path 23 of the slide 14 such that a pivoting of the locking member 15 relative to the slide 14, due to the resulting displacement of the bearing bolt 21 and the forced guiding of the guide pin 22 within the guide path 23, results in a pivoting of the lock lever 18.

In FIG. 1 the locked position of the locking member 15 is illustrated in which the locking projection 16 is positioned in one of the catch openings 13. In this position the lock lever 18 is also slightly pivoted outwardly of the contour of the locking member 15. FIG. 2 shows the release position in which the locking projection 16 of the locking member 15 is completely out of engagement with the catch opening 13. In this position the lock lever 18 is pivoted into the contour of the locking member 15 so that a free displacement of the slide 14 and thus of the guide fitting is possible.

Figure 3:
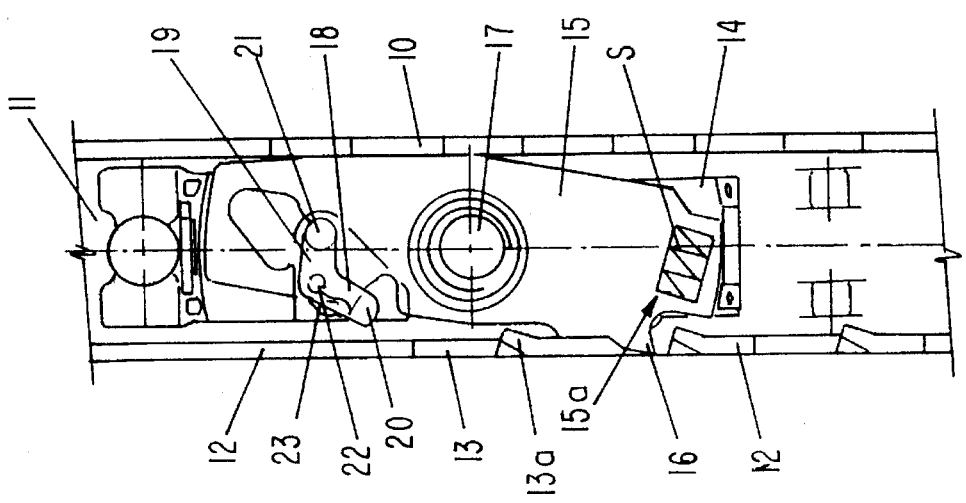
FIG. 3 shows the guide fitting of FIGS. 1 and 2 in an intermediate position of the locking member.
Figure 6:
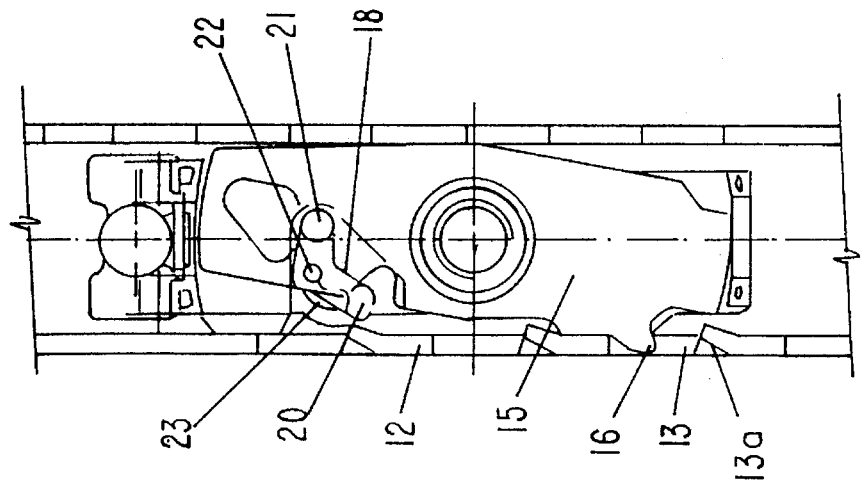
FIG. 6 shows the guide fitting of FIG. 5 after completion of tightening.

As can be seen in FIG. 3, an intermediate position is possible in which the locking projection 16 of the locking member 15 abuts on the catch projection 13a of the rail member 10. This position can especially occur when the slide 14 is moved upwardly and does not reach a locked position. In such a position the locking member 15 is pivoted relative to the slide 14 about a certain angular value and the relative movement between the aforementioned parts results in a pivoting of the lock lever 18 out of the contour of the locking member 15. In this position the lock lever 18 can already engage one of the catch projections 13a so that upon loading the slide 14 in a downward direction (arrow A) the lock lever rests at the rail member 10 and exerts torque on the locking member 15 in the direction toward engagement of the locking projection 16 in the nearest catch opening 13.

Figure 4:
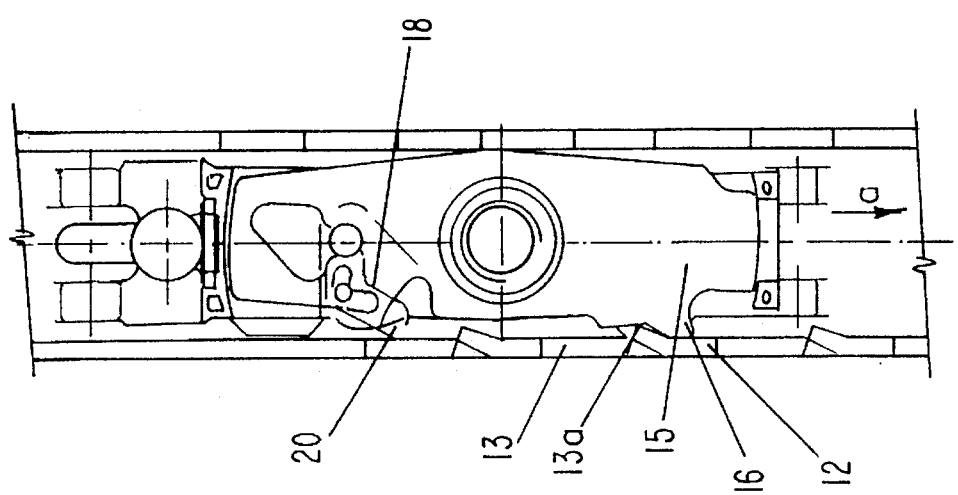
FIG. 4 shows the guide fitting according to FIGS. 1 and 2 in another intermediate position.

FIG. 4 shows another possible intermediate position in which the locking projection 16 of the locking member 15 is supported on the base of the stay 12 of the rail member 10 without engaging in a catch opening 13. The corresponding relative movement between the locking member 15 and the slide 14, which in the illustrated position has already been completed, results in a deflection of the lock lever 18, as described with respect to FIG. 3.

Figure 5:
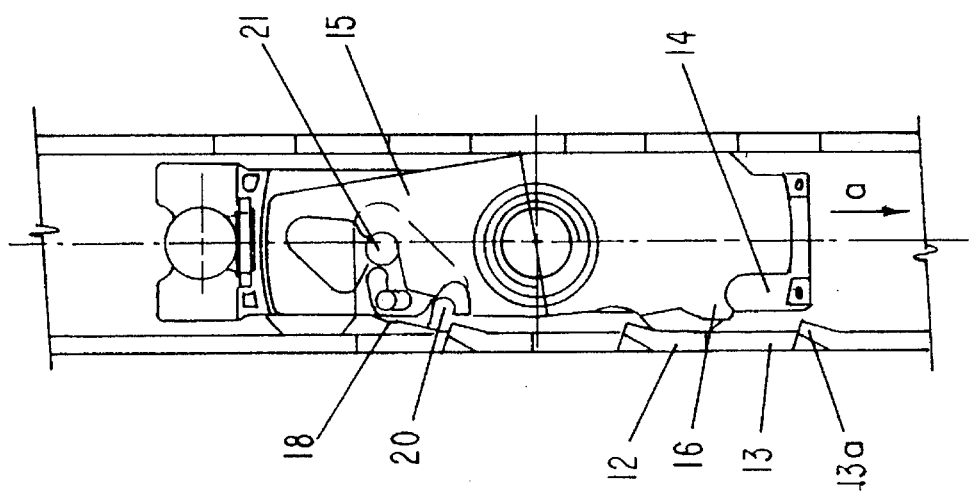
FIG. 5 shows the guide fitting of FIGS. 1 and 2 in a position during tightening of the seat belt.

FIG. 5 shows the respective movements from an initial intermediate position of the locking member 15, as shown in FIGS. 3 and 4, upon movement of the slide 14 in the direction of arrow a and the displacement of the pivoted lock lever 18 into engagement with a catch opening 13. As can be seen when comparing FIGS. 5 and 6, the support of the lock lever 18 at one of the catch openings 13, respectively, at one of the catch projections 13a results in a pivoting of the locking member 15 into its locked position so that the locked position represented in FIG. 6 after completion of the tightening movement corresponds to the initial position represented in FIG. 1.

The present invention is, of course, in no way restricted to the specific disclosure of the specification and drawings, but also encompasses any modifications within the scope of the appended claims.

What we claimed is:

1. A height-adjustable guide fitting for a seat belt of a motor vehicle, said guide fitting comprising:

a rail member connected to the motor vehicle, said rail member having a guide groove;

said rail member having catch openings spaced at a distance from one another;

a slide positioned within said guide groove so as to be longitudinally slidable therein;

a locking member connected to said slide so as to be pivotable between a locked position and a release position;

said locking member comprising a spring for biasing said locking member into said locked position;

said locking member having a locking projection for engaging in said locked position one of said catch openings to thereby block said locking member relative to said rail member;

said locking member further comprising a lock lever pivotable between a position within a contour of said locking member and an outwardly pivoted engaging position for engaging one of said catch openings; and a forced guiding system for coupling said lock lever to said slide such that a movement of said locking member relative to said slide upon displacement of said locking member from said locked position to said release position causes a pivoting of said lock lever relative to said locking member.

2. A guide fitting according to claim 1, wherein:

said forced guiding system is comprised of a guide pin and a guide path;

said guide path positioned within said slide; and said guide pin is connected to said lock lever, projects toward said slide and engages said guide path.

3. A guide fitting member according to claim 1, wherein:

said lock lever has a first and a second end and between said first and second ends a central, thin-walled section extending parallel to said locking member and abutting on said locking member;

said first end has a catch projecting within the plane of said locking member for engaging one of said catch openings;

said locking member has a bore; and said lock lever has at said second end a bearing bolt engaging said bore of said locking member.

* * * * *